(12) United States Patent
Rossini et al.

(10) Patent No.: US 11,284,711 B2
(45) Date of Patent: Mar. 29, 2022

(54) MOBILE WORKSTATION

(71) Applicant: JACO, Inc., Franklin, MA (US)

(72) Inventors: Alfred P. Rossini, Southborough, MA (US); Thomas J. Bagley, Upton, MA (US); Govind Patel, Bellingham, MA (US); David Maloney, Medway, MA (US); Jeff Silverman, Sharon, MA (US)

(73) Assignee: JACO, INC., Franklin, MA (US)

( * ) Notice: Subject to any disclaimer, the term of this patent is extended or adjusted under 35 U.S.C. 154(b) by 0 days.

(21) Appl. No.: 16/282,390

(22) Filed: Feb. 22, 2019

(65) Prior Publication Data

US 2019/0254420 A1 Aug. 22, 2019

Related U.S. Application Data

(60) Provisional application No. 62/633,943, filed on Feb. 22, 2018.

(51) Int. Cl.
*A47B 21/02* (2006.01)
*A47B 9/10* (2006.01)
*F16M 11/38* (2006.01)
*F16M 11/42* (2006.01)

(52) U.S. Cl.
CPC .............. *A47B 21/02* (2013.01); *A47B 9/10* (2013.01); *F16M 11/38* (2013.01); *F16M 11/42* (2013.01)

(58) Field of Classification Search
USPC .......................... 108/145, 25, 49, 50.01, 147
See application file for complete search history.

(56) References Cited

U.S. PATENT DOCUMENTS

| | | | | | |
|---|---|---|---|---|---|
| 2,728,621 | A | * | 12/1955 | Kempter | A47B 51/00 108/136 |
| 4,844,387 | A | * | 7/1989 | Sorgi | F16M 11/10 108/5 |
| 4,879,954 | A | * | 11/1989 | Sawamura | A47B 3/00 108/6 |
| 5,823,120 | A | * | 10/1998 | Holmquist | A47B 9/02 108/147 |
| 6,038,986 | A | * | 3/2000 | Ransil | A47B 9/02 108/145 |

(Continued)

*Primary Examiner* — Jose V Chen
(74) *Attorney, Agent, or Firm* — Kriegsman & Kriegsman (57) ABSTRACT

A mobile workstation comprises a wheeled base, a height-adjustable post assembly fixedly coupled to the rear end of the wheeled base, and a tray assembly fixedly coupled to the top of the post assembly. The post assembly has a four-post construction, with upper and lower vertical posts pivotally connected to a pair of linking posts. To accommodate different users, the post assembly is designed to articulate between an upper position and a lower position through a primarily vertical travel path. The four-post construction of the post assembly disperses the weight of the tray assembly, thereby reducing the manual force required to implement height adjustment. The planar, primarily vertical, travel path undertaken by the post assembly during height adjustment maintains the workstation center of gravity to a centralized location in the base, thereby minimizing the use of counterbalances to ensure stability. As a result, the workstation is lightweight and easily maneuverable.

10 Claims, 7 Drawing Sheets

(56) References Cited

U.S. PATENT DOCUMENTS

| | | | |
|---|---|---|---|
| 6,435,109 B1 * | 8/2002 | Dell | A47B 21/00 108/144.11 |
| 6,493,220 B1 * | 12/2002 | Clark | A47B 21/00 361/679.41 |
| 6,691,626 B2 * | 2/2004 | Warner | A47B 9/00 108/145 |
| 6,883,439 B1 * | 4/2005 | Moore | A47B 9/10 108/147 |
| 7,252,277 B2 * | 8/2007 | Sweere | F16M 11/105 248/284.1 |
| 7,506,592 B2 | 3/2009 | Rossini | |
| 7,510,479 B2 * | 3/2009 | Stengel | A63H 33/32 108/25 |
| 8,082,857 B2 * | 12/2011 | George | A61B 5/0002 108/50.01 |
| 8,100,061 B2 * | 1/2012 | Hookway | A47B 23/046 108/26 |
| 8,677,911 B2 * | 3/2014 | McRorie | G06F 1/1628 108/50.02 |
| 9,003,979 B2 * | 4/2015 | Bahnof | A47B 21/00 108/50.14 |
| 9,039,016 B2 * | 5/2015 | Abernethy | B62B 3/02 280/6.15 |
| 9,420,879 B1 * | 8/2016 | Brandenberg | A47B 13/088 |
| 9,475,514 B2 * | 10/2016 | Hardy | B62B 3/02 |
| 9,504,447 B2 * | 11/2016 | Messina | A61B 8/4405 |
| 9,814,309 B2 * | 11/2017 | Kim | A47B 21/02 |
| 10,111,518 B2 * | 10/2018 | Blackburn | A47B 21/02 |
| 10,299,582 B2 * | 5/2019 | Abernethy | B62B 3/02 |
| 2004/0262867 A1 * | 12/2004 | Arceta | A61G 12/001 280/47.35 |
| 2006/0125356 A1 * | 6/2006 | Meek | A61G 12/001 312/215 |
| 2007/0185390 A1 * | 8/2007 | Perkins | A61B 5/0002 600/300 |
| 2007/0227409 A1 * | 10/2007 | Chu | A47B 21/00 108/50.02 |
| 2008/0001043 A1 * | 1/2008 | Meyer | A47B 21/00 248/129 |
| 2010/0213679 A1 * | 8/2010 | Smith | A47B 21/00 280/47.35 |
| 2011/0042911 A1 * | 2/2011 | Kozlowski, Jr | A47B 21/02 280/47.35 |
| 2011/0232535 A1 * | 9/2011 | Hung | A61G 12/001 108/25 |
| 2012/0248719 A1 | 10/2012 | Rossini et al. | |
| 2015/0330559 A1 * | 11/2015 | Li | A47B 9/10 108/147 |
| 2016/0015167 A1 * | 1/2016 | Abu-Akel | A47B 21/02 248/161 |
| 2017/0127821 A1 * | 5/2017 | Carter | A47B 5/00 |

\* cited by examiner

MOBILE WORKSTATION

CROSS-REFERENCE TO RELATED APPLICATIONS

The present application claims the benefit under 35 U.S.C. 119(e) of U.S. Provisional Patent Application No. 62/633,943, inventors Alfred P. Rossini et al., filed Feb. 22, 2018, the disclosure of which is incorporated herein by reference.

FIELD OF THE INVENTION

The present invention relates generally to mobile workstations and, more particularly, to mobile workstations which are easily transportable and adjustable in height.

BACKGROUND OF THE INVENTION

A mobile workstation is a cart-like device that is typically designed to hold a computer and related peripheral devices in a highly accessible manner. In this capacity, the transportable nature of the workstation enables the computer to be utilized throughout a designated environment. For instance, mobile workstations, also commonly referred to in the art as mobile carts, are often utilized in medical facilities, such as hospitals, to compile and review patient data throughout a designated floor or unit.

Typically, a mobile workstation includes an upper tray which is designed to retain the various computer components in a highly accessible fashion as well as provide an enlarged, horizontally-disposed worksurface that can be used to support a wide array of items, such as portable medical equipment, patient medications, paper files and the like. The upper tray is typically mounted onto the upper end of a vertical post that extends upward from the rear of a wheeled base, or pedestal. An example of a mobile cart of the type as described above is shown in U.S. Patent Application Publication No. 2012/0248719 to A. P. Rossini et al., the disclosure of which is incorporated herein by reference.

Due to its multi-functional and transportable nature, workstations of the type as described above are commonly used by a number of different operators within a designated environment. To facilitate use by an operator with optimal ergonomic comfort, the vertical post often has a telescoping construction to allow for height adjustability of the various computer components retained on the upper tray. In this manner, the workstation can be customized in its design to suit the needs of each operator.

Mobile workstations constructed in the manner as set forth above have been found to suffer from a notable shortcoming. Namely, the use of a generally straight, telescoping post secured to the rear of the wheeled base concentrates the majority of the computer-related equipment, and accordingly the majority of the cart weight at the top of the telescoping post. With a considerable amount of weight concentrated at the top of the telescoping post, actuation of the height-adjustment feature typically requires a considerable amount of force and, as a result, is only sporadically used. Additionally, it has been found that the concentration of cart weight towards the back of the wheeled pedestal, renders the mobile workstation difficult to steer. Because open space is often limited in most designated environments, the inability to acutely manipulate the mobile cart can often compromise efficiency of use in the field.

In an effort to solve some of the aforementioned shortcomings, U.S. Pat. No. 7,506,592 to A. P. Rossini, the disclosure of which is incorporated herein by reference, describes a mobile workstation which has been specifically designed to reduce the force required to actuate the height-adjustment feature. Specifically, to facilitate height adjustment, a multi-bar post assembly is utilized in lieu of a straight, telescoping, vertical post in order to more uniformly disperse cart weight through a broader planar region. The multi-bar post assembly disclosed in the '592 patent includes a lower vertical post mounted onto the left side of the wheeled base. An upper vertical post is offset from and connected to the lower vertical post by a pair of pivotally-coupled, parallel side links, thereby creating a modifiable Z-shaped post configuration. In other words, the pivotal connection of each end of the pair of parallel side links to the upper and lower vertical posts enables the upper tray to articulate both vertically and laterally along a generally arcuate path between an upper, extended position and a lower, retracted position. As can be appreciated, the use of a non-linear, multi-bar, post construction more broadly distributes the weight of the workstation, and particularly the components mounted on the upper tray. Accordingly, the height-adjustability feature is easier to actuate than traditional mobile workstations that utilize a straight, telescoping, vertical post design.

However, it has been found that the specific design set forth in the '592 patent introduces certain drawbacks. In particular, with the lower vertical post mounted on the left side of the wheeled base, and with the tray designed to articulate both vertically and laterally along a generally arcuate travel path, the majority of the cart weight is initially uncentered and shifts laterally during height adjustment, thereby creating a highly unbalanced system. Accordingly, to prevent the cart from tipping, counterweights are often integrated into the wheeled pedestal to suitably balance, or center, the workstation.

However, it has been found that the use of counterweights significantly increases the overall weight of the mobile workstation. As a result, the cart is rendered considerably more difficult to steer during its transport, since a greater degree of force is required to compensate for the increase in product mass. Additionally, counterweights incorporated into the cart design can increase the degree of force required to actuate the height-adjustment feature.

Lastly, because mobile workstations are often in the absence of drawers or other similar storage devices, commonly-used items are often retained on a workstation by mounting certain bin-like accessories (e.g. a sanitizer-retaining basket or a handheld scanner receptacle) directly onto the post assembly. However, most conventional mobile workstations, including both carts with straight post assemblies located on the rear of the wheeled base as well as multi-bar post assemblies located on the side of the wheeled base, do not typically position these accessories in an ideal ergonomic position. Consequently, an operator, who is typically positioned in front of the workstation, often has to reach awkwardly towards the rear or side of the post assembly in order to retrieve frequently-accessed items, which is highly undesirable.

SUMMARY OF THE INVENTION

It is an object of the present invention to provide a new and improved mobile workstation.

It is another object of the present invention to provide a new and improved mobile workstation that is adapted to be adjusted in height to suit the needs of the user.

It is yet another object of the present invention to provide a mobile workstation of the type as described above which is adapted to be adjusted in height using limited force.

It is still another object of the present invention to provide a mobile workstation of the type as described above which is lightweight and easy to steer.

It is yet still another object of the present invention to provide a mobile workstation of the type as described above that has a limited number of parts, is inexpensive to manufacture, and is ergonomically designed for ease of use.

Accordingly, as a feature of the invention, there is provided a mobile workstation comprising (a) a wheeled base having a front end, a rear end and opposing sidewalls, (b) a height-adjustable post assembly having a first end and a second end, the first end being fixedly coupled to the rear end of the wheeled base, and (c) a tray assembly fixedly coupled to the second end of the post assembly, (d) wherein the post assembly is adapted to articulate through a fixed travel path between an upper, extended position and a lower, retracted position, the travel path being restricted to a common vertical plane that extends from the rear end of the wheeled base to the front end of the wheeled base.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Mobile Workstation 11

Figure 1:
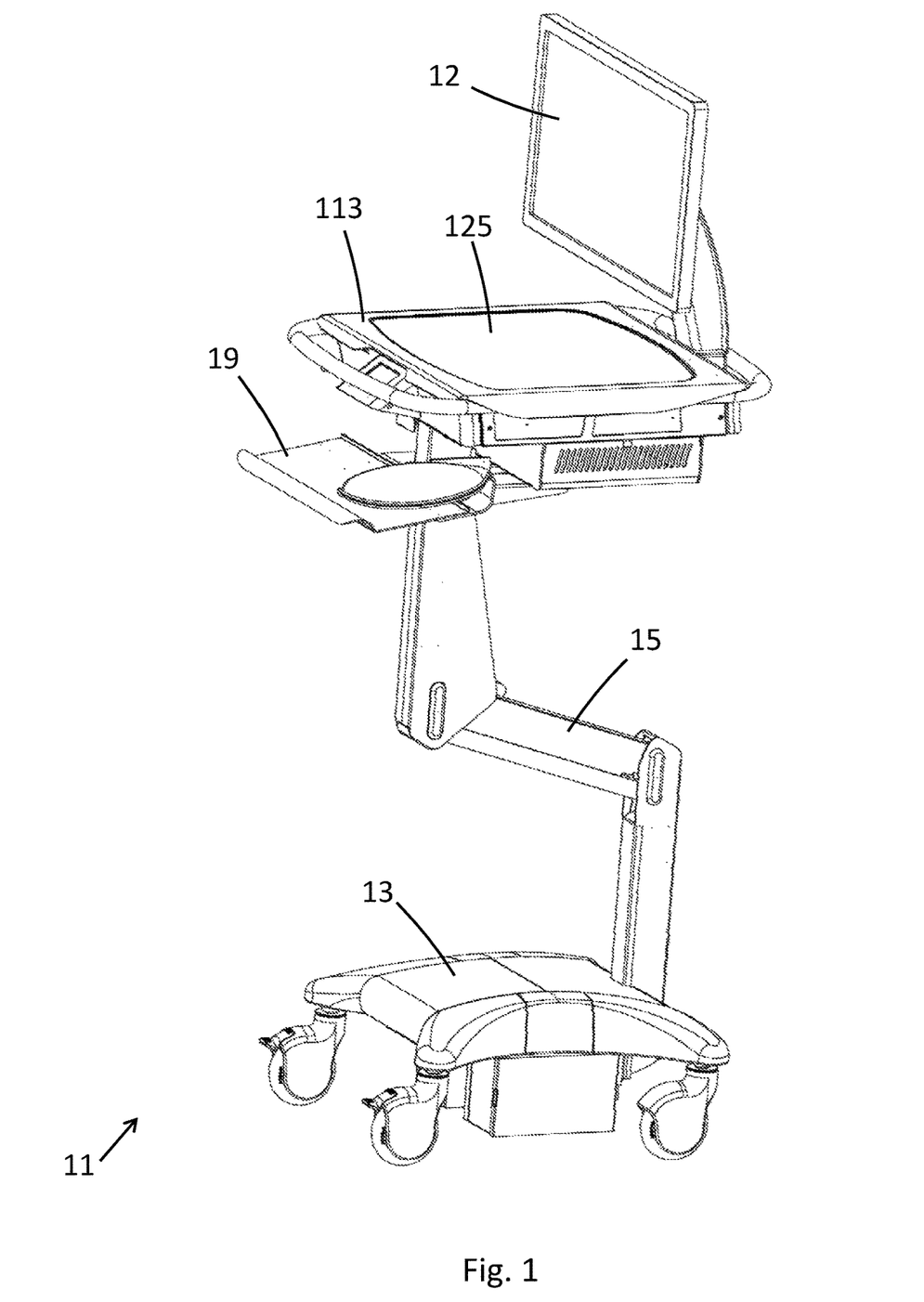
FIG. 1 is a right-side perspective view of a mobile workstation constructed according to the teachings of the present invention, the mobile workstation being shown with a monitor mounted thereon to illustrate a potential application of its usage.
Figure 2:
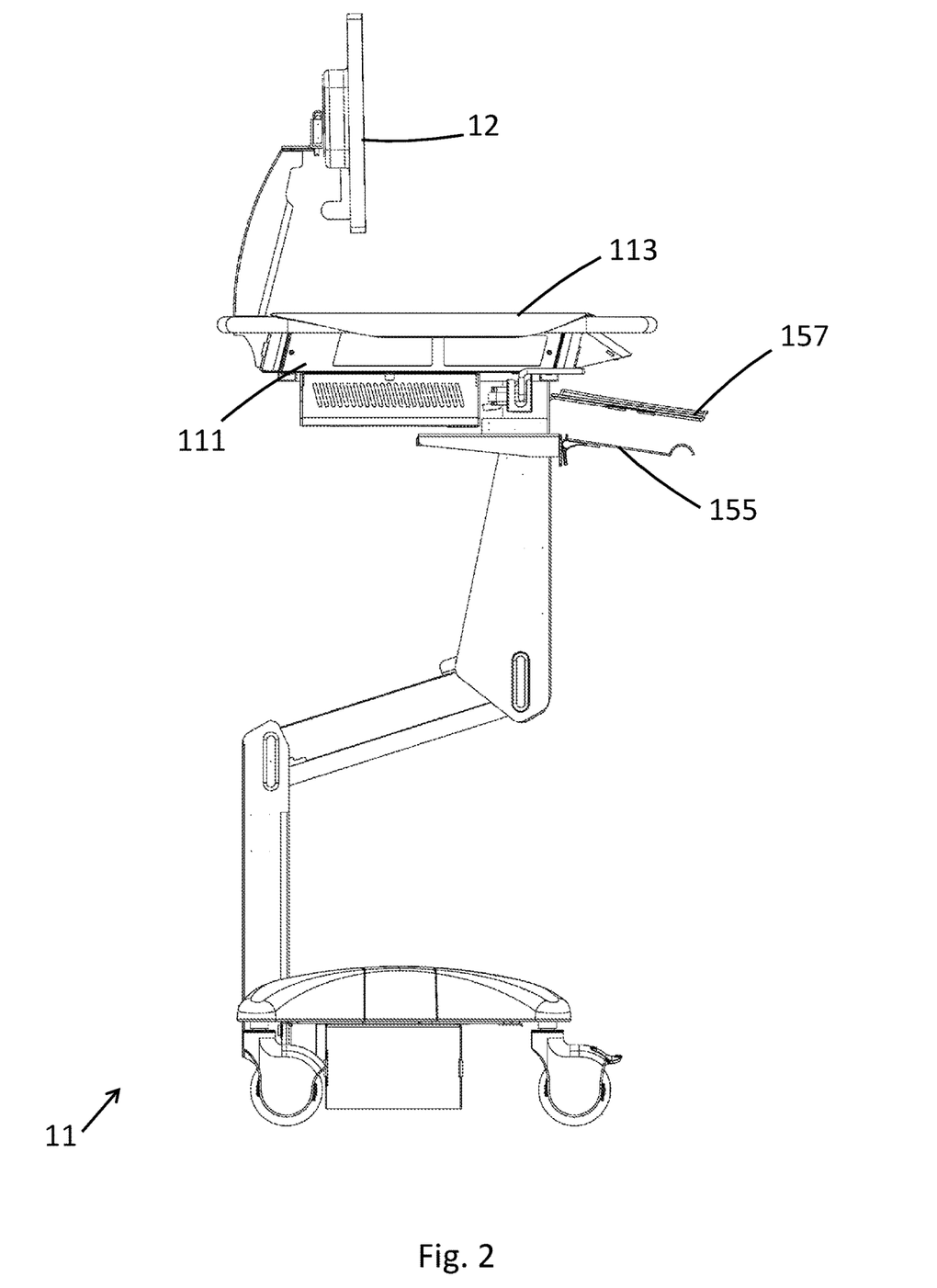
FIG. 2 is a left side view of the mobile workstation and monitor shown in FIG. 1.
Figure 3:
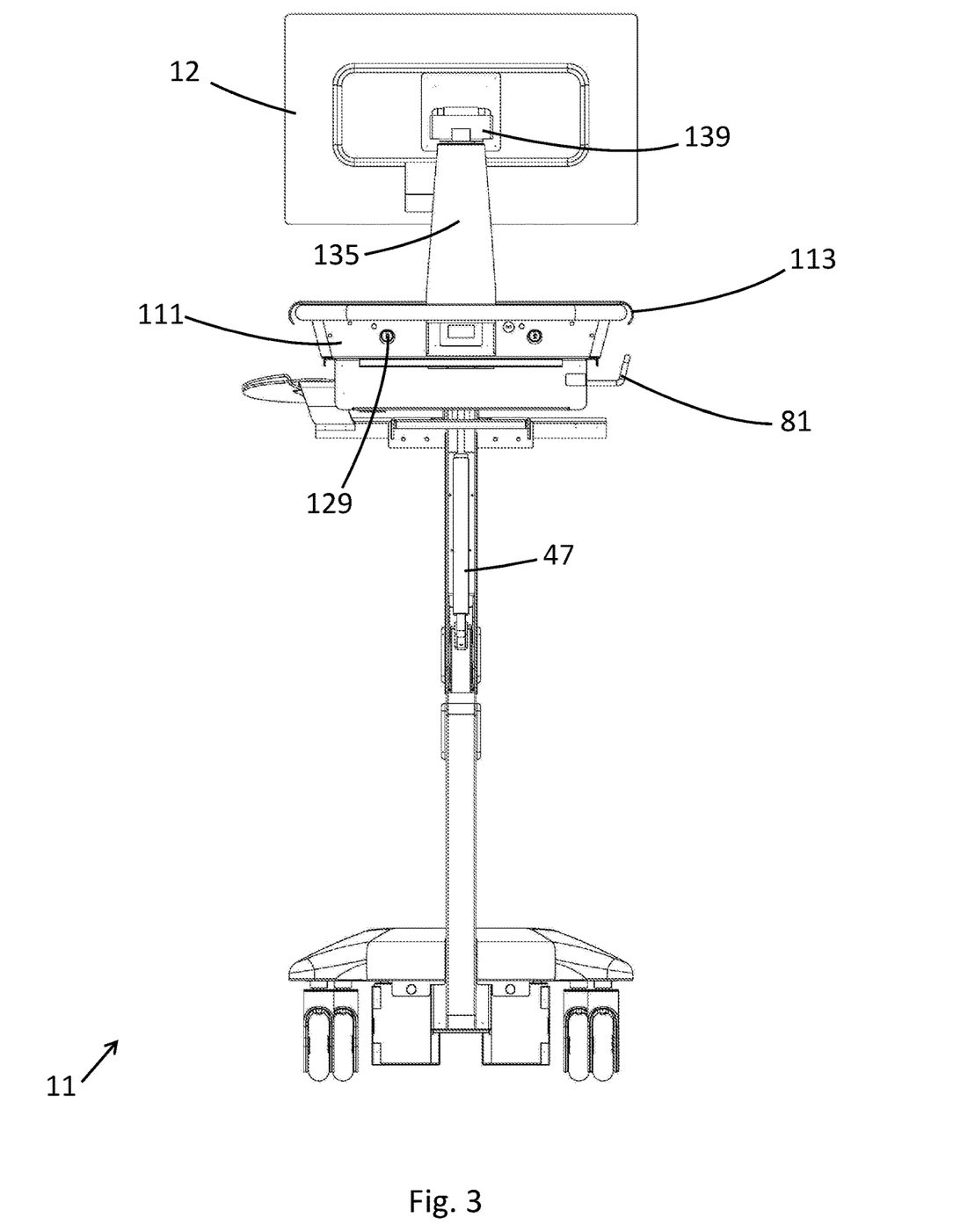
FIG. 3 is a rear view of the mobile workstation and monitor shown in FIG. 1.

Referring now to FIGS. 1-3, there are shown various views of a mobile workstation constructed according to the teachings of the present invention, the mobile workstation being identified generally by reference numeral 11. As will be explained in detail below, mobile workstation 11 is uniquely designed with a balanced and lightweight construction which, in turn, allows for greater ease and maneuverability during its transport as well as a reduction in the force required to adjust its height.

In the description that follows, mobile workstation 11 is described as being specifically configured to retain a computer and other related peripheral devices. In particular, workstation 11 is shown supporting a computer monitor 12. In this capacity, mobile workstation 11 is particularly well-suited for use in a hospital or other similar medical facility which requires an easily transportable and relatively compact computer-based system and complementary worksurface that can be utilized at various locations throughout a larger designated environment to more effectively treat patients.

However, it should be noted that mobile workstation 11 is not limited to use within a particular application or to retain any specific category of devices. Rather, it is to be understood that mobile workstation 11 could be modified, as needed, to retain a wide range of different devices for customized use within any intended setting without departing from the spirit of the present invention.

Figure 4:
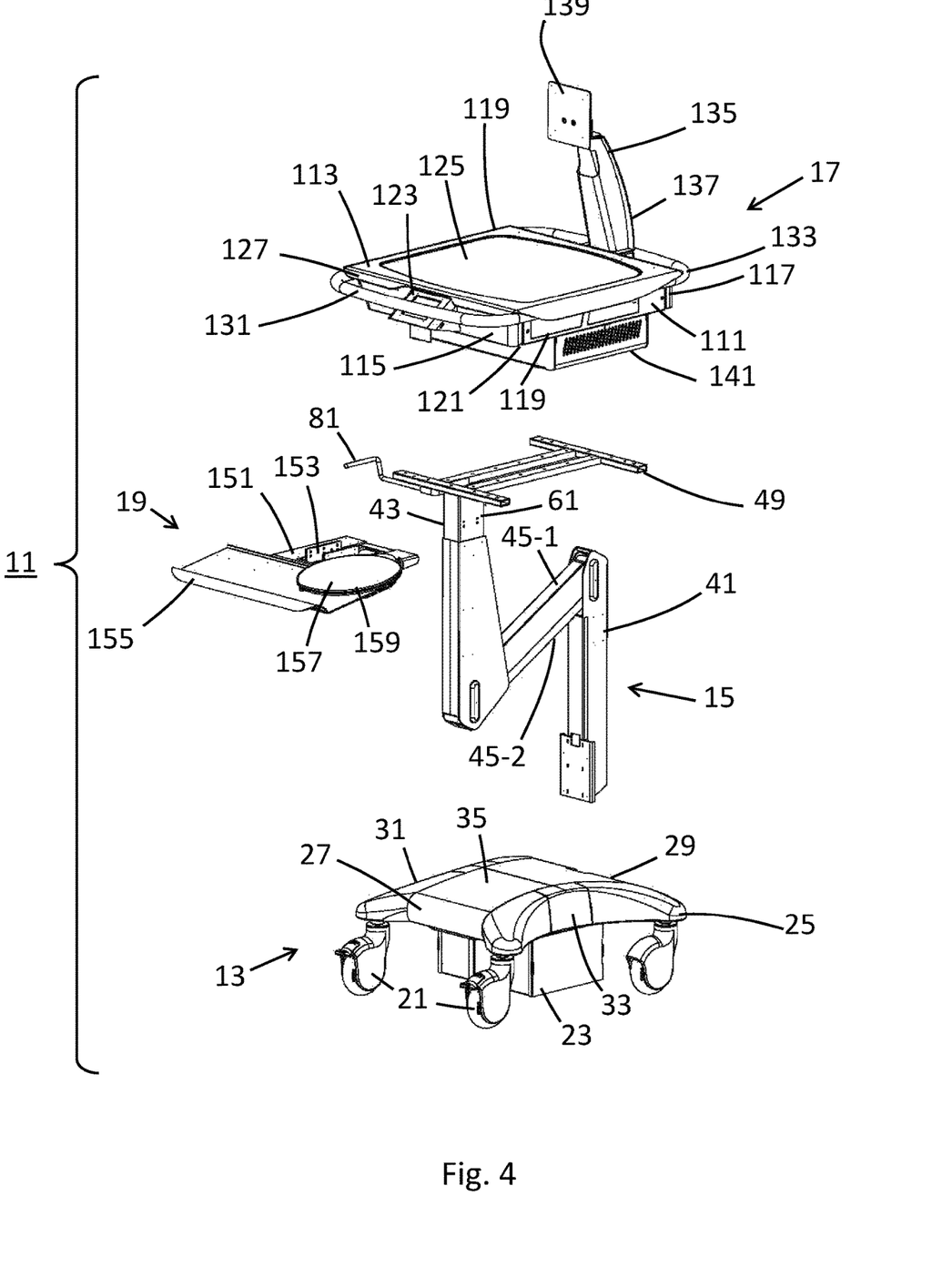
FIG. 4 is a partially exploded, right-side perspective view of the mobile workstation shown in FIG. 1.

As seen most clearly in FIG. 4, mobile workstation, or cart, 11 comprises (i) a wheeled base, or pedestal, 13 adapted to roll freely on a flooring surface, (ii) a height-adjustable post assembly 15 fixedly coupled to wheeled base 13, (iii) a horizontally-disposed tray assembly 17 that is fixedly mounted onto the distal end of post assembly 15, and (iv) a keyboard drawer 19 fixedly coupled to post assembly 15 beneath tray assembly 17. As will be explained in detail below, the particular construction and unique travel path of height-adjustable post assembly 15 provides workstation 11 with a number of notable advantages over conventional mobile carts.

Wheeled Base 13

As referenced above, wheeled base 13 is a floor-mounted pedestal that is adapted to freely roll in all directions on a flooring surface. Preferably, base 13 is similar in construction to the mobile cart base shown in U.S. Patent No. 2012/0248719 to A. P. Rossini et al., the disclosure of which is incorporated herein by reference.

Specifically, as seen most clearly in FIG. 4, wheeled base 13 preferably comprises a frame (not shown) to which a plurality of swivel casters 21 is pivotally coupled, with one or more casters 21 being of the lockable variety to enable an operator to selectively fix the position of base 13 and, as a consequence, cart 11.

Additionally, a pair of battery housings 23 is fixedly coupled to the underside of the base frame, each housing 23 being dimensioned to receive a battery for the onboard power system used to power the various electronic components retained on cart 11. For instance, each housing 23 may be sized and shaped to receive a rechargeable, lithium iron phosphate ($LiFePO_4$) battery that is serviceable within the power system, thereby ensuring that all cart electronics continuously receive adequate operational power. It should be noted that, by locating battery housings 23 in wheeled base 13, much of the weight associated with the onboard power system is positioned low, thereby creating a stable foundation for cart 11.

Lastly, a cover, or shroud, 25 is fixedly mounted onto the top of the frame. Cover 25 is preferably constructed as a unitary metallic member having a front end 27, a rear end 29, a pair of opposing sidewalls 31 and 33 and a domed top surface 35. As can be appreciated, cover 25 provides wheeled base 13 with an aesthetically pleasing overall appearance.

Height-Adjustable Post Assembly 15

Height-adjustable post assembly 15 connects both tray assembly 17 and keyboard drawer 19 to wheeled pedestal 13. As will be described in detail below, post assembly 15 relies upon a multi-bar construction to more uniformly disperse cart weight and thereby facilitate actuation of the height-adjustment feature. Additionally, in use, post assembly 15 is adapted to articulate between an upper, extended position and a lower, retracted position through a fixed travel path. As a feature of the present invention, the fixed travel path is restricted to a common vertical plane extending through the middle of base 13 from rear end 29 to front end 27 (i.e. in the absence of any lateral movement towards opposing sidewalls 31 and 33). By eliminating any lateral component of the travel path, the majority of the cart weight remains centralized, thereby minimizing the need for counterbalances that would otherwise increase the overall weight of cart 11. As a result, mobile workstation 11 is designed to be both maneuvered and/or adjusted in height using a limited amount of force, which is a principal object of the present invention.

Figure 5:
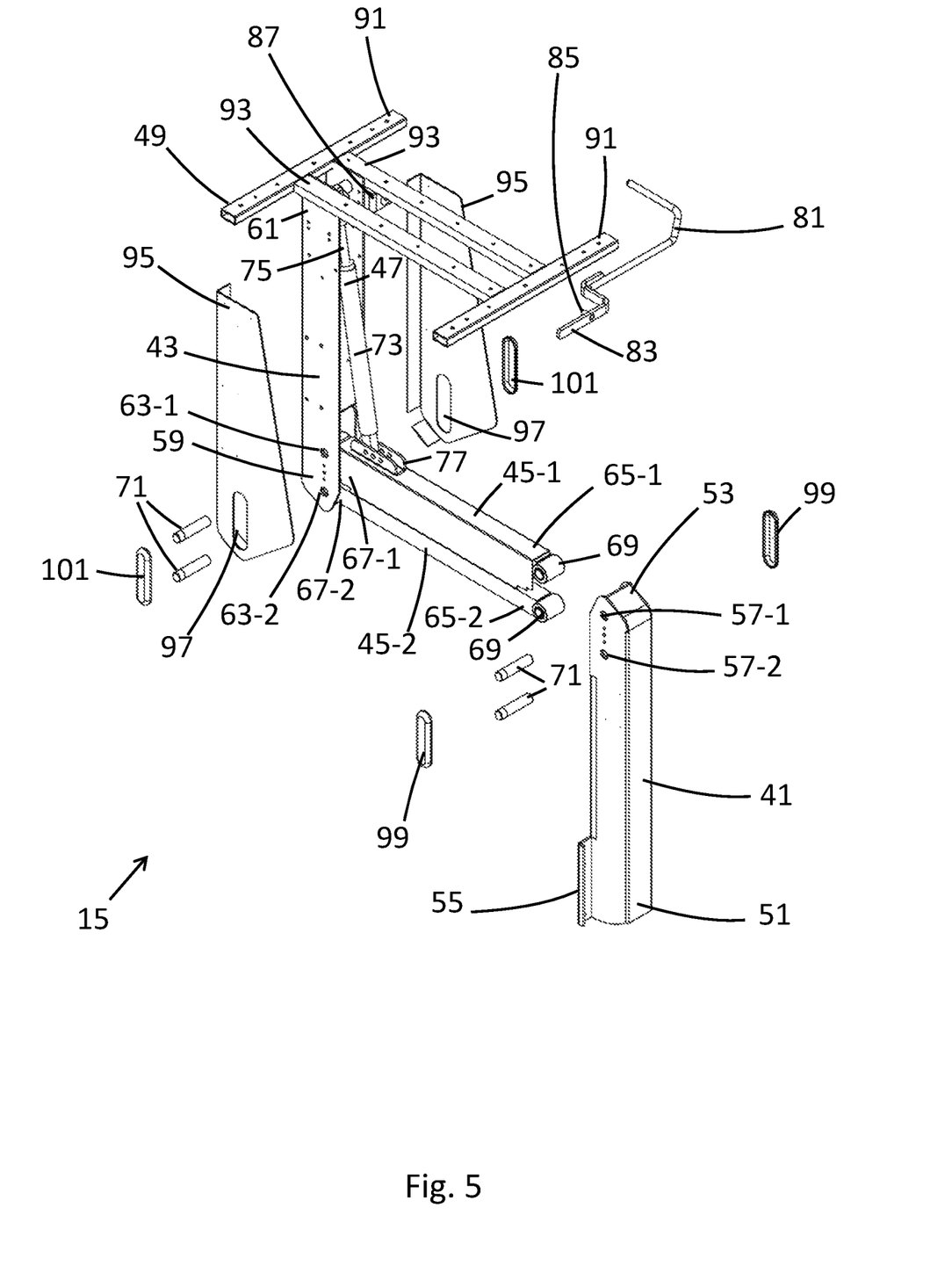
FIG. 5 is a partially exploded, right-side perspective view of the post assembly shown in FIG. 4.

Referring now to FIGS. 4 and 5, post assembly 15 comprises (i) a vertical, lower post 41 connected to rear end 29 of base 13, (ii) a vertical, upper post 43 arranged in an offset, but parallel, relationship relative to lower post 41, (iii) a pair of parallel linking posts, or side links, 45-1 and 45-2 pivotally coupled to each of posts 41 and 43, (iv) a gas spring 47 for selectively locking the orientation of upper post 43 relative to side links 45, and (v) a support bracket, or frame, 49, mounted onto the distal end of upper post 43 for supporting tray assembly 17.

As seen most clearly in FIG. 5, lower post 41 is constructed as a unitary, straight, generally rectangular, metal bar having a first end 51 and a second end 53. An enlarged, planar, mounting plate 55 is formed on first end 51 and facilitates connection of lower post 41 to rear end 29 of wheeled base 13 using appropriate fastening elements, such as screws. A pair of vertically-arranged transverse bores 57-1 and 57-2 is formed in second end 53 of post 41 and provide means for pivotally coupling parallel side links 45 thereto, as will be explained further below.

Upper post 43 is constructed as a unitary, straight, metal bar, generally U-shaped in transverse cross-section, having a first end 59 and a second end 61. A pair of vertically-arranged transverse bores 63-1 and 63-2 is formed in first end 59 of post 43 and provides means for pivotally coupling parallel side links 45 thereto, as will be explained further below.

Upper side link 45-1 is constructed as straight, metal bar having a first end 65-1 and a second end 67-1. Similarly, lower side link 45-2 is constructed as a straight, metal bar having a first end 65-2 and a second end 67-2. Generally cylindrical bushings 69 are welded onto first end 65 and second end 67 of each side link 67, the function of which to become apparent below.

As can be seen, bushings 69 on first end 65 of links 45 project within second end 53 of lower vertical post 41 in alignment with transverse bores 57. In turn, pins 71 are fittingly inserted through bores 57 and bushings 69, to pivotally connect first end 65 of links 45 with second end 53 of lower vertical post 41.

Similarly, bushings 69 on second end 67 of links 45 project within U-shaped first end 59 of upper vertical post 43 in alignment with transverse bores 63. In turn, pins 71 are fittingly inserted through bores 63 and bushings 69, to pivotally connect second end 67 of links 45 with first end 59 of upper vertical post 43.

Through the pivotal connection of side links 45 to each of vertical posts 41 and 43, post assembly 15 is adapted to articulate between an upper, extended position and a lower, retracted position through a fixed travel path. As will be explained further below, the particular orientation of post assembly 15 as well as its restricted travel path centralizes much of the cart weight and thereby enables natural gravitational forces to induce movement between its extended and retracted position.

As noted above, a gas spring 47 is provided to selectively lock the configuration of post assembly 15. Gas spring 47 comprises a cylinder, or pressure tube, 73 that coaxially receives a slidable piston 75. The distal, or fixed, end of cylinder 73 is mounted onto upper side link 45-1 via U-shaped bracket 77. As can be seen, bracket 77 is provided with a series of holes which allow for cylinder 73 to be connected to upper side link 45-1 at various locations along its length using a releasable fastening element, such as a pin and clip. By adjusting the position of cylinder 73 along link 45-1, and as a result its angle of orientation, the degree of pressure of compressed gas retained within cylinder 73 can be modified. More specifically, as cylinder 73 is affixed to bracket 77 away from second end 67-2, the greater the force of the compressed gas within tube 73. In this manner, cylinder 73 can be adjusted, as needed, to compensate for the weight of components on upper tray assembly 17, with a greater amount of weight necessitating a commensurate increase in compressed air pressure to move post assembly 15 between its retracted and extended positions.

The distal end of piston 75 is fixedly coupled to second end 61 of upper vertical post 43. As referenced above, pressure tube 73 retains a supply of compressed gas which is moved through internal chambers (not shown). Actuation of the gas spring 47 is achieved using a height actuation lever 81 which is pivotally coupled to upper vertical post 43 via linkage 83. More specifically, Z-shaped linkage 83 is fixedly mounted onto one end of lever 81 and includes a pivot post 85 that fittingly projects into an opening formed in an outwardly extending tab 87 provided at second end 61 of upper vertical post 43. Accordingly, through pivotal actuation of the free end of lever 81 (e.g. by the operator), linkage 83 rotates about pin 85 and selectively compresses a release pin in pressure tube 73 so as to allow the gas within to compress within the internal chambers. In this manner, when the pin is not compressed, the compressed gas within tube 73 locks the position of piston 75 and thereby secures the configuration of post assembly 15. By comparison, with the valve opened through actuation of lever 81, the release of compressed air within tube 73 allows piston 75 to slide freely, thereby enabling the configuration of post assembly 15 to be adjusted between its retracted and extended positions.

It should be noted that the particular location of gas spring 47 directly within upper vertical post 43 minimizes the required length of linkage 83. Accordingly, by reducing the overall length of the cantilever used to actuate gas spring 47, a relatively small manual force is required to pivot lever 81, thereby greatly facilitating the height-adjustment process.

Frame 49 is mounted onto second end 61 of upper vertical post 43 and serves as a support surface for tray assembly 17. Frame 49 is represented herein as a generally planar, I-shaped, unitary member that includes a pair of parallel end rails 91 that are connected to a pair of transversely-extending, parallel cross rails 93. Preferably, each of rails 91 and 93 is provided with a series of bores, which enable tray assembly 17 to be secured to post assembly 15 using designated fastening elements, such as screws.

For aesthetic reasons, a pair of side covers 95 is mounted onto and substantially enclose upper vertical post 43, each cover 95 being shaped to define a vertical slot 97 that is dimensioned to receive pins 71. It should be noted that side covers 95 preferably terminate in a spaced apart relationship relative to second end 61 of upper vertical post 43 to allow for the mounting of keyboard drawer 19 on post 43, as will be explained further below.

Additionally, a first set of opposing end caps 99 is mounted onto second end 53 of lower vertical post 41 to enclose transverse bores 57 as well as pins 71 retained therein. Similarly, a second set of opposing end caps 101 is mounted over slots 97 in side covers 95 to provide post assembly 15 with a more finished appearance.

Tray Assembly 17

Referring back to FIG. 4, tray assembly 17 is a generally unitary member which is fixedly secured onto frame 49 so as to lie within a generally horizontal plane. As noted previously, tray assembly 17 is preferably designed to retain a compute device and related peripheral devices in a highly compact and accessible fashion.

Specifically, tray assembly 17 comprises a main housing 111 that is selectively enclosed by a removable tray, or cover, 113. Together, housing 111 and cover 113 define a substantially enclosed interior cavity that is suitably dimensioned to receive a compute device, such as a laptop, compact desktop, or tablet computer.

Main housing 111 is preferably constructed as a five-sided, open top, metallic enclosure having a front panel 115, a rear panel 117, a pair of side panels 119, and a bottom panel 121. Although not shown, fastening elements preferably extend through side rails 91 of support bracket 49 and into bottom panel 121 in order to fixedly secure main housing 111 onto post assembly 15.

A battery monitor, or screen, 123 is preferably integrated into front panel 115. Monitor 123 is preferably in electronic communication with the power system for mobile workstation 11. In this manner, battery monitor 123 provides a visual indicator of the real-time power status for mobile cart 11. Preferably, screen 123 is additionally designed with a user-actuated work light that provides ambient light to worksurface 125, with actuation of the work light achieved via an on/off button integrated into monitor 123.

Tray 113 is constructed as an enlarged, generally flat member that is dimensioned to overlie and enclose the open top end of main housing 111. As can be seen, tray 113 includes an enlarged, central worksurface 125 which provides a horizontal surface for supporting certain commonly-used items, such as portable medical equipment, patient medications, paper files and the like. Additionally, tray 113 includes a rounded peripheral edge 127 which creates a smooth contour over various portions of the top edge of main housing 111.

As noted above, housing 111 is preferably sized and shaped to receive a compute device. As seen most clearly in FIG. 3, at least one locking mechanism 129 is preferably mounted in rear panel 117. Each locking mechanism 129 is designed to selectively secure tray 113 onto housing 111 and therefore protect against unauthorized access or theft of a computer retained within housing 111.

A front handle 131 and a rear handle 133 are fixedly secured to opposite ends of housing 111. As can be appreciated, the inclusion of two handles 131 and 133 serves to facilitate manipulation of mobile cart 11 within a designated workspace.

A stand, or mount, 135 for a monitor (e.g. monitor 12) is connected to rear panel 117 of housing 111 and projects upward for enhanced visibility. Stand 135 includes a hollowed, vertical arm 137 and a flat mounting bracket 139 formed on the distal end of arm 137. As such, a monitor is adapted to be secured onto bracket 139, with electric cabling for the monitor run through hollowed arm 137 to facilitate connection with a computer located within housing 111.

Lastly, tray assembly 17 compromises an optional auxiliary housing 141. Housing 141 is preferably in the form of a vented metallic enclosure which is disposed beneath main housing 111 and is fixedly secured to the underside of cross rails 93 using suitable fastening elements. Auxiliary housing 141 preferably serves as an electronics bay for retaining any necessary cooling fans or electronics. In particular, housing 141 is preferably dimensioned to receive an inverter/charger unit for the cart power system. As can be appreciated, it has been found that, in certain environments where dust or other similar contaminants may be prevalent on the floor surface, it may be preferred to locate the inverter/charger unit for the cart power system within auxiliary housing 141.

Keyboard Drawer 19

As referenced above, keyboard drawer 19 is fixedly coupled to post assembly 15 beneath tray assembly 17 and is designed to support certain peripheral devices. Specifically, as seen most clearly in FIG. 4, keyboard drawer 19 includes a frame 151 that is slidably connected to a pair of vertical, or upstanding, flanges 153. As can be appreciated, flanges 153 are designed to lie flush against opposing surfaces of upper vertical post 43 at second end 61. Using fastening elements, flanges 153 are fixedly secured to upper vertical post 43, thereby enabling frame 151 to slide forward or rearward relative to post assembly 15.

A keyboard shelf, or tray, 155 is fixedly coupled to the front of bracket 151 and is dimensioned to support a computer keyboard. Additionally, a circular mouse pad 157 is coupled to bracket 151 above shelf 155 and is dimensioned to support a computer mouse. A C-shaped wire guard 159 is rotatably mounted on the periphery of pad 157 and is designed to prevent a computer mouse from inadvertently falling off pad 157. The rotatable nature of wire guard 159 allows for its orientation to be adjusted to accommodate both right-handed and left-handed operators.

Height-Adjustment Feature of Mobile Workstation 11

Figure 6A:
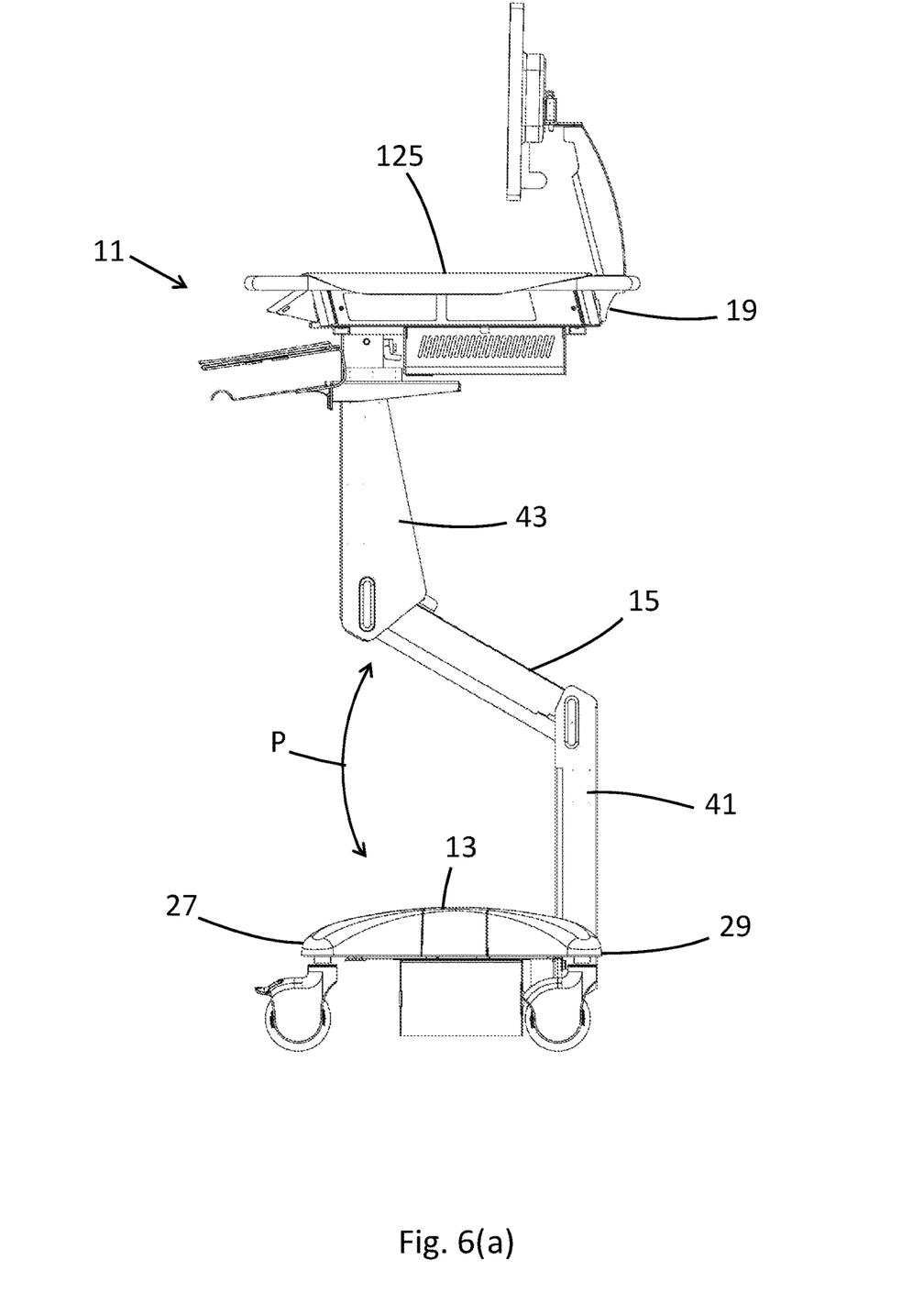
FIG. 6(a) is a right-side view of the mobile workstation and monitor shown in FIG. 1, the mobile workstation being shown in its upper, extended position.
Figure 6B:
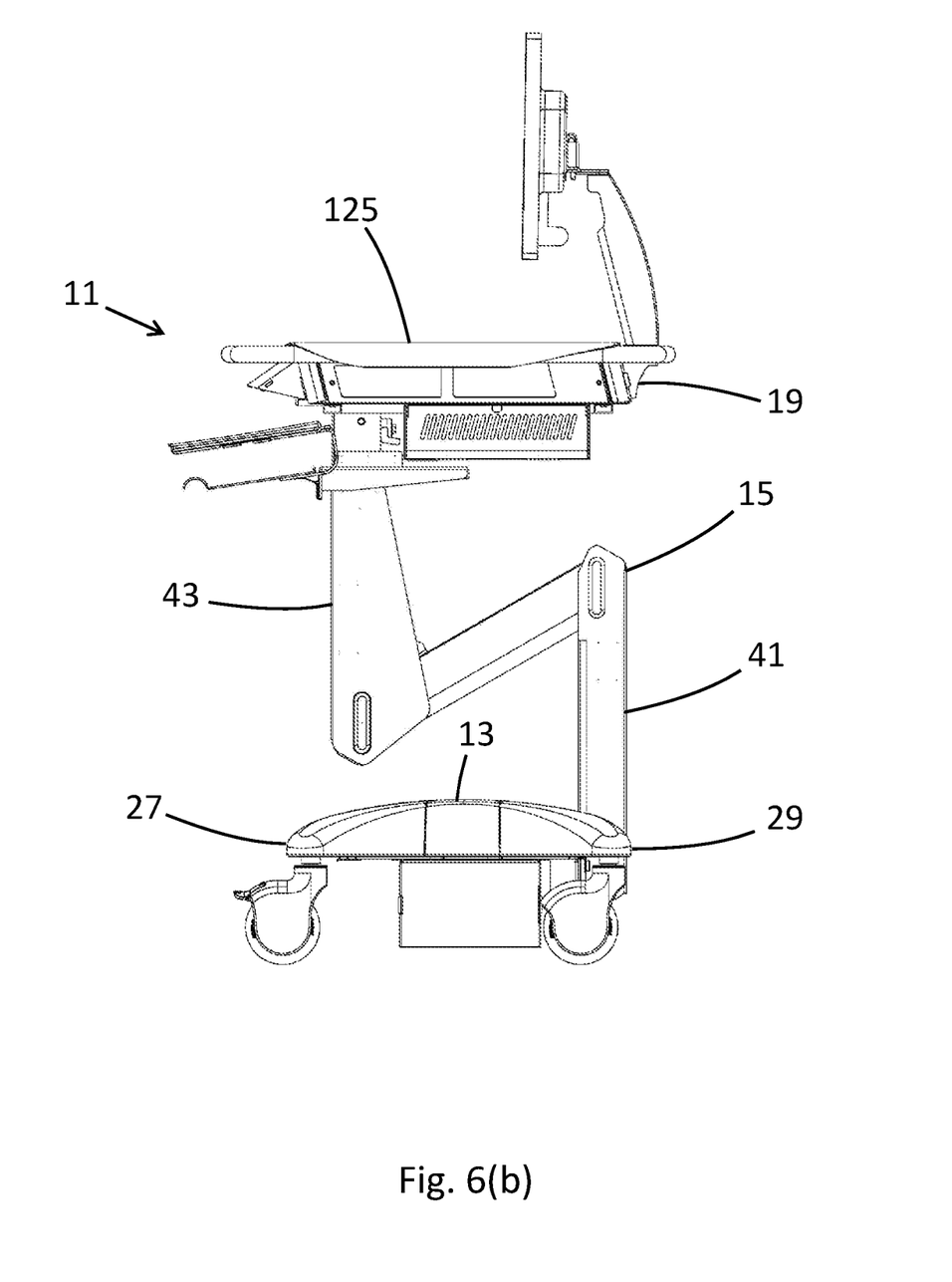
FIG. 6(b) is a right-side view of the mobile workstation and monitor shown in FIG. 6(a), the mobile workstation being shown in its lower, retracted position.

As referenced above, the unique construction of post assembly 15 enables the height of mobile workstation 11 to be adjusted in a simple and easy manner. Referring now to FIGS. 6(a) and 6(b), there are shown right-side plan views of mobile workstation 11 configured at two different height settings. Specifically, in FIG. 6(a), mobile workstation 11 is shown in an upper, extended position, whereas, in FIG. 6(b), mobile workstation 11 is shown in a retracted, lower position.

As a primary feature of the present invention, post assembly 15 is designed to articulate between the upper, extended position and the lower, retracted position through a fixed, slightly arcuate but primarily vertical, travel path P, as shown in FIG. 6(a). More specifically, lower vertical post 41 is secured to rear end 29 of wheeled pedestal 13 and remains extending vertically upward therefrom. Disposed as such, the majority of the cart weight, and in particular the weight associated with tray assembly 19 and components retained therein, is centered in wheeled base 13. Upon adjusting the height of workstation 11, post assembly 15 articulates along a common vertical plane that extends from the center of rear end 29 to the center of front end 27. In other words, post assembly 15 articulates in the absence of any lateral movement (i.e. towards opposing sidewalls 31 and 33). Furthermore, because travel path P is only slightly arcuate, the majority of the cart weight remains centralized throughout the height-adjustment process, which is highly desirable.

It has been found that by distributing of majority of cart weight broadly throughout post assembly 15 due to its unique multi-bar construction, while, at the same time, maintaining a center of gravity for cart 11 at the approximate midpoint of wheeled base 13 throughout the height-adjustment process, mobile workstation 11 is afforded a number of notable advantages over traditional mobile carts.

As a first advantage, with cart weight remaining largely centralized throughout the height-adjustment process, mobile workstation 11 requires minimal use of counterbalances to maintain stability and thereby prevent tipping. As a result, the overall weight of cart 11 is considerably less (e.g. as much as 60 pounds less) than conventional carts. Due to its lightweight construction, mobile workstation 11 is easily maneuverable.

As a second advantage, the broad dispersal of weight throughout post assembly 15 as well as the front location of gas spring 47 creates a more balanced, or smoother, displacement between retracted and extended positions. In fact, it has been found that lowering cart 11 from its upper, extended position to its lower, retracted position can be achieved almost entirely using natural gravitational forces. As a result, the height-adjustment feature is rendered simple and easy to perform. In fact, it is envisioned that an adjustment in height can be implemented by an operator using only one hand, which was previously inconceivable.

As a third advantage, the particular orientation and travel path of post assembly 15 maintains upper vertical post 43 towards the front of mobile cart 11 throughout the entire height-adjustment process. Because upper vertical post 43 is the primary structure onto which bin-like accessories are secured, frequently accessed items, which are commonly retained within such accessories, (e.g. handheld scanners, wristband printers, card scanners, cleaning wipes containers and the like) are located in an optimal ergonomic position.

As a fourth advantage, the construction, orientation and travel path of post assembly 15 ensures that both lower post 41 and upper post 43 remain vertical at all times. As a consequence, worksurface 125 of tray assembly 17 remains horizontal throughout the height-adjustment process, which is critical since loose items (e.g. medications, papers or sensitive equipment) is often disposed thereon during routine use of cart 11.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A mobile workstation comprising:
   (a) a wheeled base having a front end, a rear end and opposing sidewalls;
   (b) a height-adjustable post assembly comprising,
      (i) a lower post having a first end and a second end, the first end of the lower post being fixedly connected to the rear end of the wheeled base,
      (ii) an upper post having a first end and a second end,
      (iii) a pair of linking bars, each of the pair of linking bars having a first end and a second end, the first end of each of the pair of linking bars being pivotally connected to the second end of the lower post and the second end of each of the pair of linking bars being pivotally connected to the first end of the upper post;
      (iv) a gas spring for selectively locking the orientation of the post assembly, the gas spring comprising a pressure tube that coaxially receives a slidable piston, the pressure tube being coupled to at least one of the pair of linking bars, the piston being connected to the upper post; and
      (v) a lever for actuating the pressure tube, the lever being pivotally coupled to the second end of the upper post; and
   (c) a tray assembly fixedly coupled to the second end of the upper post, the tray assembly comprising a front handle;
   (d) wherein the post assembly is adapted to articulate through a fixed travel path between an upper, extended position and a lower retracted position, the travel path being restricted to a common vertical plane that extends from the rear end of the wheeled base to the front end of the wheeled base, the post assembly being adapted to articulate through the fixed travel path in the absence of any lateral movement.

2. The mobile workstation as claimed in claim 1 wherein the lower post and the upper post are arranged in a linearly offset and parallel configuration.

3. The mobile workstation as claimed in claim 2 wherein the lower post and the upper post remain in a vertical orientation throughout articulation of the post assembly.

4. The mobile workstation as claimed in claim 3 wherein the pressure tube for the gas spring is connected to the at least one linking bar through a bracket mounted on the at least one linking bar.

5. The mobile workstation as claimed in claim 4 wherein the pressure tube is adapted to connect to the bracket at multiple positions between the first and second ends of the at least one linking bar.

6. The mobile workstation as claimed in claim 5 wherein the post assembly further comprises a horizontal frame on which the tray assembly is fixedly mounted, the frame being fixedly mounted on the second end of the upper post.

7. The mobile workstation as claimed in claim 3 wherein the tray assembly comprises a main housing that is selectively enclosed by a tray, the tray having a planar worksurface.

8. The mobile workstation as claimed in claim 7 wherein the tray assembly comprises a battery monitor in the main housing that is adapted to be electrically connected to a power system for the mobile workstation.

9. The mobile workstation as claimed in claim 7 wherein the tray assembly further comprises a rear handle, the front handle and the rear handle being fixedly coupled to opposite ends of the main housing.

10. The mobile workstation as claimed in claim 7 wherein the tray assembly comprises an auxiliary housing coupled to the main housing, the auxiliary housing being adapted to receive a battery for the mobile workstation.

\* \* \* \* \*